Dec. 22, 1964    J. MERCIER ETAL    3,162,014
HYDRAULIC CONTROL SYSTEM
Filed June 22, 1962    6 Sheets-Sheet 1

FIG.1
FIG.1A
FIG.2

INVENTORS
JEAN MERCIER
BERNARD MERCIER
BY Dean, Fairbank & Hirsch
ATTORNEYS

Dec. 22, 1964 J. MERCIER ETAL 3,162,014
HYDRAULIC CONTROL SYSTEM
Filed June 22, 1962 6 Sheets-Sheet 3

FIG. 4

INVENTORS
JEAN MERCIER
BERNARD MERCIER
BY
Dean, Fairbank & Hirsch
ATTORNEYS

Dec. 22, 1964    J. MERCIER ETAL    3,162,014
HYDRAULIC CONTROL SYSTEM
Filed June 22, 1962    6 Sheets-Sheet 4

INVENTORS
JEAN MERCIER
BERNARD MERCIER
BY

Dean, Fairbank & Hirsch
ATTORNEYS

Dec. 22, 1964   J. MERCIER ETAL   3,162,014
HYDRAULIC CONTROL SYSTEM

Filed June 22, 1962   6 Sheets-Sheet 5

FIG. 7

INVENTORS
JEAN MERCIER
BERNARD MERCIER
BY
Dean, Fairbank & Hirsch
ATTORNEYS

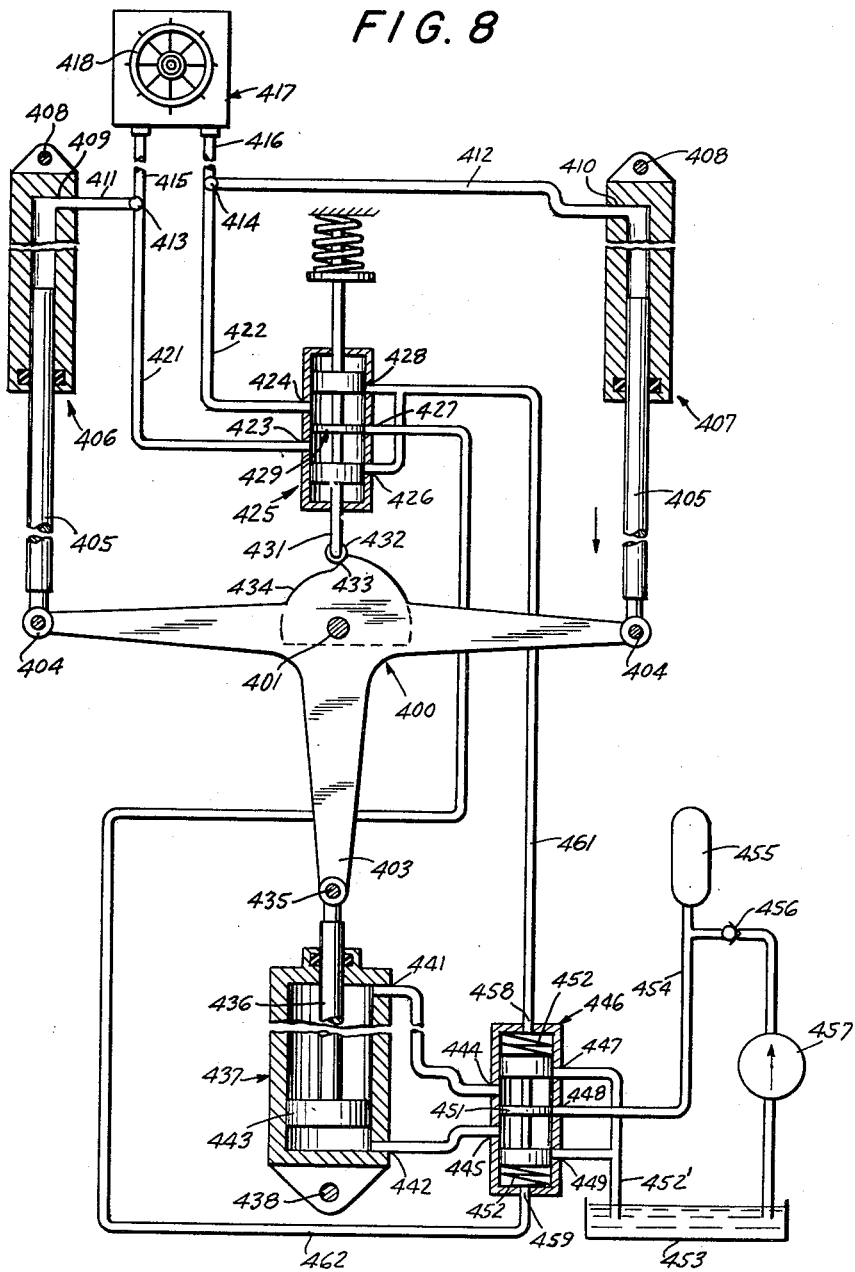

United States Patent Office 3,162,014
Patented Dec. 22, 1964

3,162,014
HYDRAULIC CONTROL SYSTEM
Jean Mercier, 1185 Park Ave., New York, N.Y., and Bernard Mercier, New York, N.Y.; said Bernard Mercier assignor to Mercier Olaer Patent Corporation, Wilmington, Del., a corporation of Delaware
Filed June 22, 1962, Ser. No. 204,328
Claims priority, application France Dec. 26, 1961
28 Claims. (Cl. 60—51)

This invention relates to the art of hydraulic control systems, more particularly of the type to effect remote control of the rudder shaft of a ship.

As conducive to an understanding of the invention it is noted that where the rudder shaft of a ship requires considerable force for actuation thereof through an appreciable range of movement and with sufficient rapidity to correct the course of a large ship for relatively large deviation from on course direction, where low power fluid under pressure is applied to actuate the rudder shaft from its neutral "on course" position by the manual rotation of the steering wheel, it will be ineffective for this purpose.

Where a large amount of force is applied upon initial rotation of the steering wheel, the rudder will swing considerably from its neutral position rendering it difficult to provide smooth correction to "on course" movement of the ship.

It is accordingly among the objects of the invention to provide a hydraulic control system which is relatively simple in construction and dependable in operation and which upon operation of a control member, will effect relatively slow initial movement of a controlled member from its neutral position and thereupon with continued movement of said controlled member will apply relatively great force thereto to effect continued movement of said controlled member in the same direction as its initial movement.

Another object is to provide a system of the above type in which the initial movement of the controlled member is effected by the manual pumping of fluid and the subsequent movement is effected by the application of a relatively high power source.

Still another object is to provide a system of the above type in which a plurality of sources of fluid under pressure are provided so that upon failure of one of said sources, the other will be available to effect the desired movement of the controlled member.

According to the invention these objects are accomplished by the arrangement and combination of elements hereinafter described and more particularly recited in the claims.

In the accompanying drawings in which are shown one or more of various possible embodiments of the several features of the invention, FIG. 1 is a diagrammatic view of one embodiment of the invention;

FIG. 1A is a diagrammatic representation of a conventional telemotor and reversing valve.

FIG. 2 is a diagrammatic view on an enlarged scale of a portion of the system of FIG. 1 showing particularly the hydraulic reversing valve in section;

FIG. 4 is a view similar to FIG. 1 of another embodiment of the invention useful for larger ships;

FIG. 7 is a view similar to FIG. 1 of still another embodiment of the invention useful for still larger ships, and FIG. 8 is a view similar to FIG. 1 of another embodiment of the invention useful for smaller ships.

Figure 3:
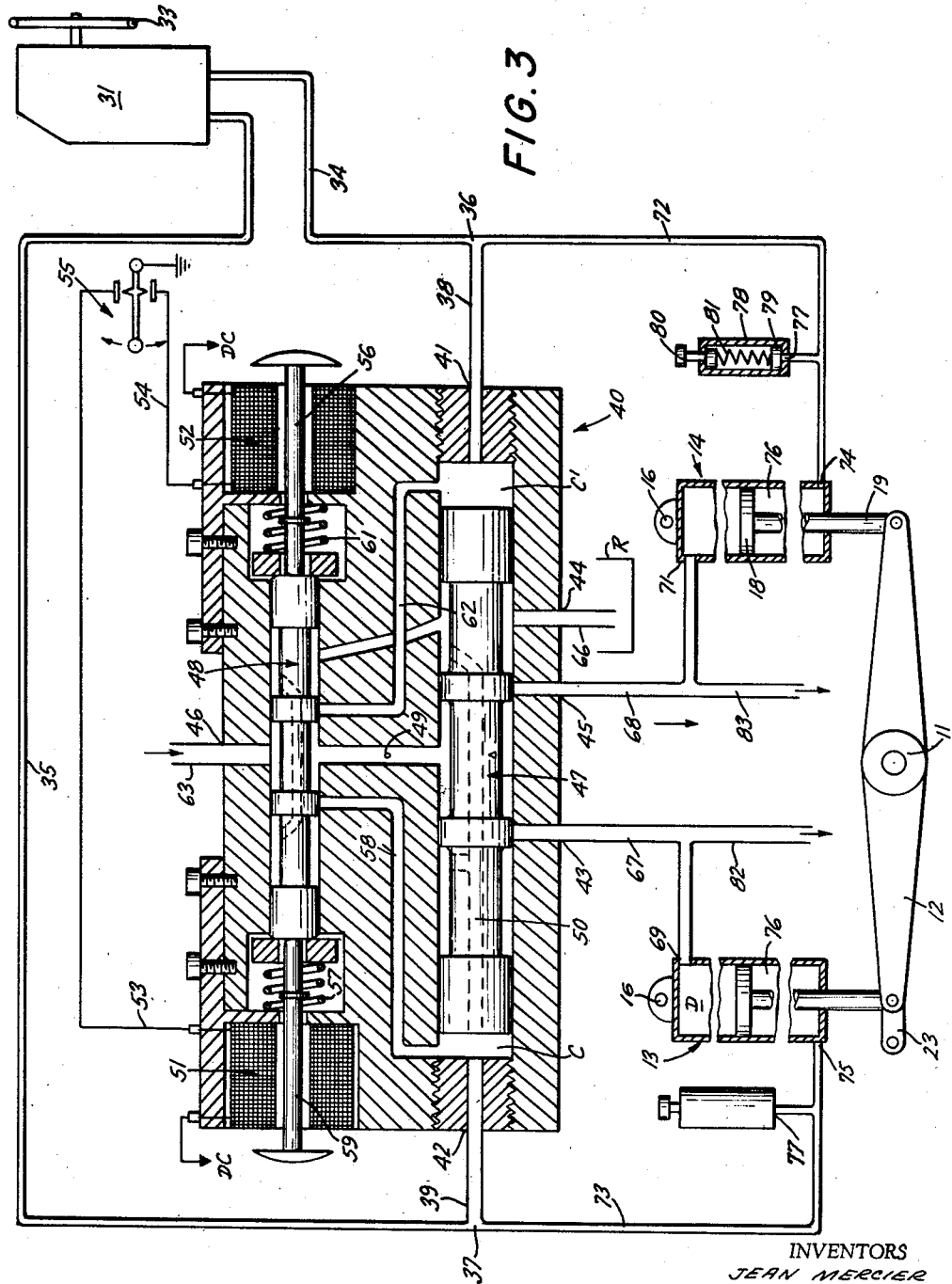
FIG. 3 is a detail sectional view showing the control valve employed in FIG. 1.

Referring now to the drawings, the hydraulic equipment shown in FIG. 1 is designed, for example, to control the rudder shaft 11 of a ship.

To this end, the rudder shaft 11 has secured thereto and extending at right angles therefrom, a rudder bar 12 to which hydraulic actuators 13 and 14 are connected.

The actuators 13 and 14 which are identical, are positioned in substantially the same plane as the rudder bar on each side of the shaft 11. Each of the actuators comprises a cylindrical casing 15 pivoted at one end as at 16 to a fixed support 17. Slidably mounted in the casing 15 is a piston 18 which has secured thereto a piston rod 19 which extends through an opening 21 in one end of the casing 15.

The free end of each of the piston rods 19 is pivotally connected as at 22 to the top surface of the rudder bar 12, the pivots 22 being equally spaced from the axis of the shaft 11. One end of the rudder bar has a longitudinal extension 23 to the undersurface of which is pivotally connected as at 24 the end of a piston rod 25. The piston rod 25 is connected to the piston 26 of an additional hydraulic actuator 27, which comprises a cylinder 28 having an opening at one end through which the piston rod extends and pivotally connected at its other end as at 29 to a fixed support. The additional hydraulic actuator 27 is also in substantially the same plane as the rudder bar 12 and in the neutral position shown, the pivotal mount 29 of the additional actuator 27, the pivots 24 and 22 and the shaft 11 are all in longitudinal alignment.

To control the hydraulic actuators 13, 14 and 27, a relatively low power pressure source 31 of fluid and a high power pressure source 32 of fluid are provided.

The low power pressure source 31 comprises, for example, a tele-motor which may be mounted on the deck of the ship and may include a pump (not shown) controlled by the steering wheel 33. When the steering wheel is turned in one direction, fluid under pressure will flow, for example, through line 34 and be returned through line 35 and when the steering wheel is rotated in the opposite direction, the fluid will flow through line 35 and return through line 34.

The lines 34 and 35 are connected respectively to junctions 36 and 37 which in turn are connected respectively to lines 38, 39 to the pressure ports 41 and 42 of a hydraulic control valve 40.

The valve which is clearly shown in FIG. 3, has four additional ports 43, 44, 45 and 46, which are controlled by slidable valve members 47, 48.

Thus, when fluid under pressure is applied say to port 42 and the valve member 47 is moved to the right from the neutral position shown, the ports 45, 46 will be connected through the passageway 49 in valve 40 and the ports 43, 44 will be connected through passageway 50 in valve member 47. When fluid under pressure is applied to port 41 to move the slidable valve member 47 to the left from the neutral position, the ports 43, 46 will be connected and the ports 44, 45 will be connected, the pressure port 46 being effectively closed when valve member 47 is in the neutral position.

Flow of fluid under pressure from pressure source 32 which is connected to pressure port 46 by line 63 may in addition to being controlled by telemotor 31, also be controlled by two solenoids 51 and 52, which illustratively form part of valve 40. The solenoids are controlled by leads 53 and 54 connected to a switch 55, positioned on the deck of the ship adjacent the steering wheel 33. The switch is of the type that when in its neutral or central position, both of the solenoids will be de-energized and when the switch is moved to one side of the neutral position, the solenoid 51, for example, will be energized and when the switch is moved to the other side of the neutral position, the solenoid 52 will be energized.

Thus, referring to FIG. 3, when solenoid 52 is energized, the plunger 56 thereof will move to the left moving valve member 48 to the left against the force exerted by spring 57.

When this occurs, even though the valve member 47 is in neutral position, pressure port 46 will be connected by passageway 58 to the chamber C on the left side of valve member 47. As a result, the valve member 47 will be moved to the right connected ports 45, 46 and ports 43, 44.

When solenoid 51 is energized, the plunger 59 thereof will move to the right, moving valve member 48 to the right against the force exerted by spring 61.

As a result, pressure port 46 will be connected by passageway 62 to chamber C' on the right side of valve member 47. Consequently, valve member 47 will be moved to the left, connecting ports 43, 46 and 44, 45.

The pressure source 32 of fluid under pressure, to which the port 46 of the hydraulic valve 40 is connected by line 63 may be of any conventional type, and the port 44 is connected by line 66 to the reservoir R for return of fluid, said reservoir illustratively being part of the pressure source 32.

The ports 43, 45 of the valve 40 are connected respectively by lines 67 and 68 to ports 69 and 71 leading into the actuators 13, 14 between the pistons 18 and the pivoted ends 16 thereof. The junctions 36 and 37 are connected by lines 72 and 73 to ports 74 and 75 leading into the actuators 13, 14 on the other side of the pistons, 18, i.e., into the annular chambers 76 formed by the piston rods 19. In addition, the lines 72 and 73 are also connected to the inlet ports 77 of shock absorbers 78 which are identical. Thus, the shock absorbers comprise a cylinder closed at one end and having the port 77 at its other end, said cylinder having a piston 79 slidably mounted therein and urged toward port 77 by a spring 81, the tension of which may be adjusted by turning knob 80.

The ports 69 and 71 are also connected by lines 82 and 83 to junctions 84 and 85 and through one-way check valves 86 and 87 to line 88. The check valves are designed to permit flow of fluid only from ports 69 and 71 toward line 88. The line 88 is connected through pressure relief valve 89 to reservoir R, said relief valve 89 being designed to open when the pressure exerted thereagainst exceeds a predetermined amount.

The junctions 84 and 85 are connected by lines 92 and 93 to the ports 94 and 95, 96 respectively, of a reversing valve 98 (FIG. 2), said valve having two additional ports 99 and 101 connected by lines 102 and 103 to lines 104 and 105. The lines 104 and 105 are connected to the ports 106 and 107 on each side of piston 26 of hydraulic actuator 27 and also through one-way check valves 108 and 109 to line 88, said check valves permitting flow only in direction from ports 106 and 107 to the relief valve 89.

The valve 98 (FIG. 2) has a slidable valve member 111 controlling the ports thereof and in the neutral position of the valve member, flow through the ports is cut off. To effect movement of the valve member 111, the hydraulic cylinder 27 has secured thereto and rigid therewith a curved actuating arm 112 which has a reduced portion 113 at its free end defining an inclined camming surface 114. In the neutral position shown of the hydraulic actuator 27, a roller 115 at the end of the extension 116 of the valve member 111 will be retained against, say, the mid portion of camming surface 114 by spring 117 to retain the valve member 111 in the neutral position shown. When the hydraulic actuator 27 is pivoted in a counterclockwise direction from the position shown in FIG. 1, as the roller 115 rides down cam surface 114, the slidable valve member 111 of valve 98 will be moved to the left to connect ports 94, 101 and 95, 99 and when the hydraulic actuator 27 is pivoted in a clockwise direction from the position shown, as the roller 115 rides up cam surface 114, the slidable valve member 111 will be moved to the right to connect ports 94, 99 and 96, 101.

*Operation, FIGS. 1–3*

In the operation of the equipment shown in FIGS. 1 to 3, assuming that the ship is steering a straight course with the rudder thereof aligned with the longitudinal axis of the ship and with the rudder bar 12 at right angles to the longitudinal axis of the ship, with the valve 40 in its neutral position, all of the ports 46, 43, 44 and 45 will be closed and hence no fluid under pressure will be flowing through the line 63. With the switch 55 in the neutral position shown, the solenoids 51 and 52 will be de-energized.

Assuming that it is desired to move the rudder shaft in a clockwise direction from the position shown, the steering wheel 33 of the telemotor 31 is turned by the helmsman in direction to force fluid from the pump (not shown) controlled by the steering wheel 33 through line 35. As a result, fluid under pressure will flow through such line 35 to junction 37 and to port 42 of the valve 40 as well as to port 75 leading into the annular chamber 76 of hydraulic actuator 13.

The application of pressure to port 42 will cause the valve member 47 of valve 40 to move to the right, connecting ports 46, 45 and ports 43, 44. As a result of the connection of ports 46 and 45, fluid under pressure will be supplied from the power source 32 through line 63, connected ports 46, 45 to port 71 of actuator 14 and to line 83.

Application of fluid under pressure to port 71 of actuator 14 will cause the piston thereof and hence the piston rod 19 to move outwardly, the fluid in annular chamber 76 of said actuator 14 flowing from port 74 through line 72 and return line 34 back to the pump of the telemotor 31. Due to the outward movement of the piston rod 19 of actuator 14 which reacts against the rudder bar 12, the rudder bar will be moved in a clockwise direction from the position shown in FIG. 1.

Fluid under pressure is applied to the port 71 of actuator 14 so long as the valve 40 has had its valve member 47 moved to the right by the application of pressure fluid to port 42 thereof which continues so long as the helmsman rotates the steering wheel 33.

As the rudder bar 12 moves in a clockwise direction, the actuator 27 will be pivoted in a counterclockwise direction about its pivot 29. Consequently, the pivotal connection of the piston rod 25 of actuator 27 to the rudder bar will move out of longitudinal alignment with pivots 29 and 22 and hence the actuator 27 will now be capable of exerting force against the rudder bar 12.

Referring to FIGS. 1 and 2, prior to movement of actuator 27, the valve member 111 of valve 98 will maintain the ports 94, 95, 96 in closed position. As soon as the actuator 27 starts to pivot in a counterclockwise direction, the roller 115 will ride down the inclined surface 114 permitting valve member 111 to move to the left. As a result, ports 94, 101 and 95, 99 will be connected. Since fluid under pressure from port 46 of valve 40 is applied to port 95 through lines 93 and 83 and hence to port 99 of valve 98, such fluid will flow through lines 102 and 104 to port 106 of actuator 27 moving its piston rod 25 outwardly to urge the rudder bar 12 in a clockwise direction providing additional force to that exerted by the movement of the piston rod 19 of actuator 14. The fluid in actuator 27 to the right of the piston 26 thereof will be forced through port 107 and lines 105, 103, through the ports 101 and 94 of valve 98 and lines 92, 82, 67 through ports 43 and 44 of valve 40 back to the reservoir R.

Assuming, at this time, the helmsman stops rotating the steering wheel 33, at this time valve means in the lines 34, 35 from the telemotor will close and immediately there will no longer be any fluid under pressure supplied through line 35 or returning through line 34.

The valve means in the lines 33, 35 and associated circuitry of the telemotor are conventional and are diagrammatically shown in FIG. 1A.

Thus, the steering wheel 33 controls a pump P which has its inlet connected to reservoir R and its outlet connected to port P–1 of valve V and the ports P–2, P–3 of valve V are connected to each other and to reservoir R.

The valve V has two additional ports P–4, P–5 connected to lines 34, 35 respectively. The movable valve member VM of valve V which is of the conventional reversing type is normally retained in neutral position by coil springs S and the valve member VM is movable to either of two extreme positions by solenoids SL.

In the neutral position of the valve, the ports thereof are closed. In one extreme position, ports P–1, P–4 and P–2, P–5 are connected so that fluid under pressure will be applied to line 34 and returned through line 35 and in the other extreme position of the valve ports P–1, P–5 and P–3, P–4 are connected so that fluid under pressure will be applied to line 35 and returned through line 34.

The steering wheel of telemotor 31 when rotated operates pump P which forces fluid under pressure, from reservoir R to port P–1. In addition, when steering wheel 33 is rotated, it actuates conventional control circuits in casing C, to energize either of the solenoids SL depending upon the direction of rotation of the steering wheel, the solenoids being automatically deenergized when no rotation is imparted to the steering wheel so that the valve will immediately return to neutral position.

As the construction and operation of such telemotor is conventional and per se forms no part of the invention, it will not be further described.

Due to the fact that at this moment the ports 46, 45 of valve 40 will still be connected, there will still be additional fluid under pressure from source 32 applied to port 71 of actuator 14 as well as to port 106 of actuator 27 so that the movement of the rudder bar 12 in a clockwise direction will continue slightly causing the piston 18 of actuator 13 to move further toward the closed end of the actuator 13. Since no additional fluid under pressure is being applied to port 75, connected to the annular chamber 76 of actuator 13, such further movement of the piston 18 of actuator 13 will increase the volume of the annular chamber 76 of actuator 13 and hence permit the fluid in line 39 leading into port 42 of the valve 40 to flow into the annular chamber 76 so that the valve member 47 of valve 40 will immediately return to its neutral position due to the pressure in lines 72, 38 from actuator 14 closing the ports 46, 43, 44 and 45.

As the result of the closure of such ports, the source of fluid from the power source 32 will immediately be cut off so that no further movement will be effected of the piston rods 19 and 25 of actuators 14 and 27 and hence no further movement will be imparted to the rudder bar 12.

It is to be noted that the return of valve 40 to its neutral or closed position occurs almost immediately after rotation of the steering wheel is stopped.

If the helmsman then desired to return the ship to straight line movement, i.e., if the helsman desires to adjust the rudder so that it is longitudinally aligned with the longitudinal axis of the ship, he need merely turn the steering wheel 33 in the opposite direction, i.e., so that fluid from the pressure source 31 will be supplied through line 34.

As a result, such fluid under pressure will also be applied to port 74 of actuator 14 as well as to the port 41 of the valve 40. Application of pressure to port 41 of valve 40 will cause the slidable valve member 47 thereof to move to the left connecting ports 46, 43 and ports 44, 45.

As a result of such connection of the ports, fluid under pressure will flow from the power source 32 through line 63, ports 46, 43 to port 69 of actuator 13 and also through lines 82 and 92, ports 94 of valve 98 which is in communication with port 101, lines 103 and 105 to port 107 of actuator 27.

Consequently, the piston rod 19 of actuator 13 will move outwardly reacting against the rudder bar 12 to rotate the latter in a counterclockwise direction and in addition, since the piston rod 25 of actuator 27 will move inwardly, additional force will be exerted against the rudder bar 12 to effect such movement in a counterclockwise direction. So long as the helmsman rotates the steering wheel in such desired direction, the valve 40 will remain open and the piston rod 19 of actuator 13 will move outwardly and the piston rod 25 of actuator 27 will move inwardly. When the rudder bar 12 has been moved sufficiently so that it is in the neutral position shown, at which time the actuator 27 will be longitudinally aligned with the rudder bar 12, the actuator 27 will no longer have any effect on the movement of the rudder bar and at this time the valve 98 will be in closed position as shown. When the rudder bar is in neutral position, which is readily determined by the helmsman by a suitable indicating mechanism which is conventional, and hence is not shown, he will stop rotation of the steering wheel.

As previously described, the continuation of the application of fluid under pressure through the open valve 40 to actuator 13 will cause the piston rod 19 of actuator 14 to move inwardly an additional amount, thereby relieving the pressure on the line 38 connected to port 41 so that the slidable valve member 47 thereof will return to neutral position thereby closing the ports 46, 43, 44 and 45.

With the arrangement shown in FIG. 1, the rudder shaft 11 may be rotated through an angle of 90° from the neutral position shown. Thus, even though the hydraulic actuators 13, 14 alone will provide but little force when they have moved the rudder bar in either counterclockwise or clockwise direction, to an angle approaching 90°, due to the relatively small lever action then provided, the addition of the hydraulic actuator 27 reacting against the rudder bar will provide sufficient force to effect movement of the rudder bar through such angle of 90°.

In the event that the telemotor 31 should be disabled, the steering action may still be effected by the electrical controls provided.

Thus, with the telemotor disabled and no fluid under pressure flowing through either lines 34 or 35, the helmsman may merely move the switch 55 to the left or right as desired to effect the steering action. Thus, if the switch is moved from the neutral position to left or right, either the solenoid 51 or 52 will be energized to effect movement of the slide member 48, thereby connecting the ports 46, 43, 44 and 45 in the same manner as if the valve member 47 was actuated by fluid under pressure applied to the ports 41 or 42.

In the event, while the ship is sailing, a wave should strike the rudder causing the latter to move suddenly, in either a clockwise or counterclockwise direction, means are provided to prevent injury to the hydraulic system.

Thus, assuming that the rudder is moved in a clockwise direction, and due to the impact of a wave against the rudder, the piston rod 19 of actuator 14 is moved outwardly the piston rod 19 of actuator 13 will move inwardly. As the piston rod of actuator 14 moves outwardly, the fluid in annular chamber 76 thereof will pass through the port 74 into the port 77 of the shock absorber 78 reacting against the spring urged piston 79 therein to take up the surge of pressure. At the same time as the piston rod of actuator 13 moves inwardly, the fluid under pressure will pass through port 69 and line 82 reacting against check valve 86, forcing the latter off its seat and reacting against the relief valve 89 which is set to open at a predetermined pressure to bleed the fluid into the reservoir R. Similar action will occur when the rudder is suddenly moved by the impact of a wave in a counterclockwise direction.

In the event that the main power supply 32 should fail, the ship is still capable of being steered under the action of the fluid under pressure from the telemotor 31 which, depending upon the rotation of the steering wheel, is forced into the ports 75 and 74 respectively of actuators 13 and 14.

Thus, when fluid under pressure is applied through line 35 of the telemotor and it enters the port 75 of actuator 13, it will cause the piston rod 19 thereof to move inwardly reacting against the rudder bar 12 to move the latter in a clockwise direction. At this time, since the fluid under pressure is also applied to port 42 of the valve 40, the latter will be actuated to connect ports 43, 44 to provide return to the reservoir R of the fluid in the chamber D of actuator 13. As the piston rod of actuator 13 moves inwardly, the piston rod of actuator 14 will move outwardly and the fluid in annular chamber 76 thereof will flow through port 74, lines 72 and 34 back to the telemotor to complete the circuit.

It is to be noted that the hand operated telemotor 31 provides relatively low power to the system and the power source 32 high power to the system, such low power being sufficient for small corrections in the course of the ship.

In the embodiment shown in FIG. 4, the equipment is designed to apply greater power to the rudder shaft than that provided by the embodiment shown in FIGS. 1 to 3.

Referring to FIG. 4, the telemotor 121 illustratively has two sources of fluid under pressure which are controlled simultaneously by the steering wheel 122. Thus, when the steering wheel 122 is rotated in one direction, fluid under pressure will be provided through lines 123 and 124 and return of fluid will be provided through lines 125 and 126.

The rudder shaft 127 of the ship, which is controlled by the telemotor 121, has secured thereto a rudder bar 128 extending at right angles to the rudder shaft. Pivotally connected as at 130 to the free end of the rudder bar 128 on the undersurface thereof is one end of the piston rod 129 of hydraulic actuator 131, the latter being positioned in substantially the same plane as the rudder bar 128 and having a slidable piston 132 therein to which one end of the piston rod 129 is secured. As is clearly shown in FIG. 4, the cylinder of the actuator 131 is pivotally mounted as at 133 to a fixed support. When the rudder is longitudinally aligned with the axis of the ship, the rudder bar 128 will also be so aligned and in such position the pivot defined by shaft 127; the pivot point 130 and the pivot 133 of the actuator 131 will all extend along the same longitudinal line as is clearly shown in FIG. 4.

Pivotally connected to the undersurface of rudder bar 128 between its ends is one end of a link 134, the other end of which is pivotally connected as at 135 to the end of arm 140 of a substantially L-shaped lever 136. As shown in FIG. 4, the other arm 137 of the lever 136 is pivotally mounted as at 138 between its ends. Pivotally connected as at 139 to the end of arm 137 of lever 136 and to the arm 137 on the other side of the pivot 138 as at 141 (said pivot points 139 and 141 being equally spaced from the pivot 138), are the free ends of the piston rods 142 of hydraulic actuators 143 and 144 which are identical as shown.

The hydraulic actuators 143, 144 desirably are of the type shown in Patent No. 3,009,322 and each illustratively comprises an outer cylinder 145 in which is slidably mounted an inner cylinder 146 closed at one end as as 147 and extending through an opening 148 in the outer end of cylinder 145. Slidably mounted in the inner cylinder 146 is the piston rod 142 which extends through an opening 149 in the outer end thereof. The actuators 143 and 144 are pivotally mounted at their ends as at 151 to a fixed support and extend in substantially a horizontal plane; the pivotal connection of said piston rods 142 to lever 136 being on the undersurface thereof.

An additional actuator 152 is provided which comprises a cylinder positioned in substantially a horizontal plane and pivotally connected at one end as at 153 to a fixed support. The actuator 152 has a piston 154 slidably mounted therein to which one end of a piston rod 155 is secured, the other end of the piston rod 155 being pivotally connected to the end of the lever 136 at the pivot 135 on the undersurface of said lever.

The lines 123 and 124 from the telemotor 121 are connected to ports 156 and 157 leading into outer cylinder 145 and piston rod 142 of actuator 143, said piston rod 142 illustratively being hollow and the lines 125 and 126 of telemotor 121 are connected to ports 158 and 159 of actuator 144.

Figure 6:
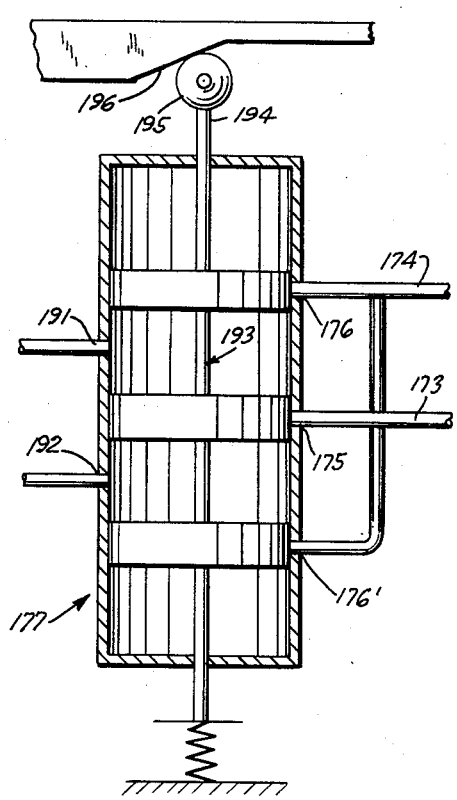
FIG. 6 is a view similar to FIG. 5 of the reversing valve of FIG. 4.

The ports 161 and 162 of actuator 152 leading into the cylinder thereof on opposed sides of the piston 154 thereof, are connected by lines 163 and 164 to junctions 165 and 166. Junctions 165 and 166 are connected by lines 167 and 168 to ports 169 and 171 of valve 172; by lines 173 and 174 to ports 175 and 176, 176' of the valve 177 (FIG. 6) which is similar to valve 98 (FIG. 2) and also through check valves 178 and 179 to line 181, the check valves permitting flow in direction to line 181. The line 181 is connected to a pressure relief valve 182 which may be set to any predetermined value to discharge fluid through return line 183 to a reservoir R, illustratively in the power source S. The line 181 is also connected through one-way valves 184 and 185 and lines 186 and 187 to the ports 188 and 189 of actuator 131 and also to the ports 191 and 192 of valve 177, the check valves 184 and 185 permitting flow only in direction toward the relief valve 182.

The valve 177 has a spring loaded valve member 193 and is normally in position to close ports 175, 176, 176'.

The extension 194 of valve member 193 has a roller 195 at its outer end which is retained against the mid portion of the inclined camming surface 196 of an actuating arm 197 when the rudder bar 128 is in the neutral position shown in FIG. 4. As is clearly shown the actuating arm 197 comprises an elongated bar of reduced width at one end as at 198 defining such camming surface 196.

The bar is slidably mounted through block bearings 198' and the end thereof is pivotally connected through link 199 to a finger 201 rigidly secured to the end of rudder bar 128.

Positioned on each side of the rudder bar 128 and adapted to be engaged thereby when the rudder bar moves in either a clockwise or a counterclockwise direction beyond an angle of say 35°, in each direction, are the plungers 202 of microswitches 203 and 204.

These microswitches are in circuit with a switch 205 which may be mounted on the deck of a ship. The microswitches 203, 204 are electrically connected to the solenoids of valves 206 and 207. The valves are of the type that when de-energized, they will provide a path between ports 208 and 209 thereof and when energized the ports 208, 209 and 211 will be connected. The ports 211 are connected by common return line 212 to one side of check valves 213, the other sides of which are connected to lines 124 and 126 from the telemotor, the check valves permitting flow only in direction from ports 211 to said lines 124 and 126. The ports 209 of valves 206 and 207 are connected to lines 124 and 126. The valve 172 shown in FIG. 5 has control ports 215, 216, and 217, 218 at each end. The ports 215 and 217 are connected by lines 219 and 221 to lines 125 and 123 and the ports 216, 218 are connected by lines 222 and 223 to ports 208 of valves 207, 206.

The valve 172 is of the type that in neutral position, as shown, the ports 169 and 171 thereof will be closed and when the valve member 224 thereof is moved upwardly in the illustrative embodiment shown, the ports 225, 171 and 226, 169 will be connected and when moved downwardly the ports 225, 169 and 226', 171 will be connected. The port 225 of the valve 172 is connected by line 228 to pressure source of fluid S which may be similar to that shown in the embodiment of FIG. 1 and the ports 226, 226' are both connected to return line 229 which leads to the reservoir.

Figure 5:
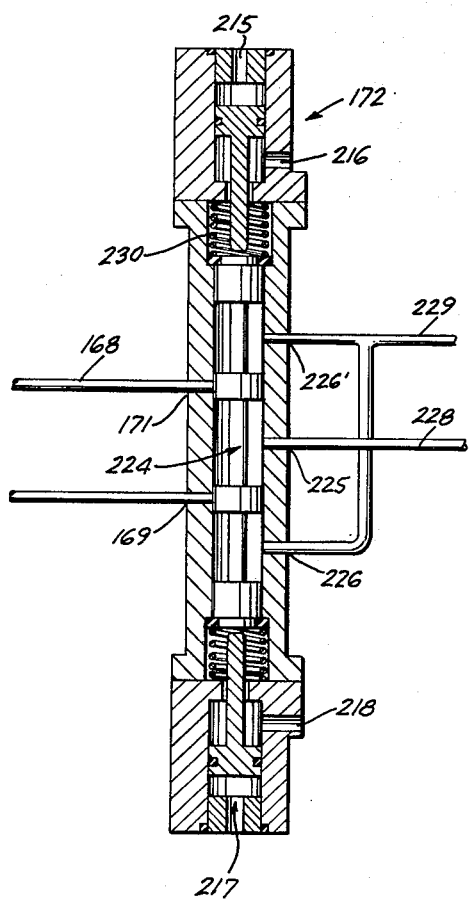
FIG. 5 is a longitudinal sectional view showing the control valve used in the embodiment of FIG. 4.

Operation, FIGS. 4–5

In the operation of the equipment shown in FIG. 4 and FIG. 5, assuming the ship is at sea, in order to provide a safeguard against a 90° turn at full speed which could break the rudder shaft, the switch 205 is closed so that the microswitches 203, 204 and valves 206, 207 are readied for operation.

When the steering wheel 122 of the telemotor is turned in one direction, say to apply fluid under pressure through lines 123, 124, such fluid will enter ports 156, 157 of actuator 143. As the chambers 0 and 0' of actuator 143 are supplied simultaneously with substantially equal pressures, there will exist in the chamber 0' a pressure sufficient to elongate the assembly 146-142 with a given force and in chamber 0 a pressure capable of displacing the said assemblies 146-142 toward a position corresponding to the complete extension of the apparatus with a force greater than that bringing about the elongation of said assembly 146-142 due to the fact that the diameter of the cylinder 146 is greater than that of member 142.

As a result, the piston rod 142 will be moved outwardly reacting against the end of lever 136 causing the latter to tend to rotate in a counterclockwise direction.

At the same time, such pressure fluid will be applied through lines 123-221 to port 217 of valve 172 and through line 124, communicating ports 209-208 of valve 206, line 223 to port 218 of valve 172.

As a result, the valve member 224 (FIG. 5) of valve 172 will be moved upwardly to connect ports 225-171 and 226-169.

As a result of such connection of the ports, fluid under pressure will be supplied from power source S, line 228, port 225-171, lines 168, 164 to port 162 of actuator 152 to move the piston rod 155 thereof inwardly thereby reacting against the lever 136 to urge the latter in a counterclockwise direction and through the link 134 causing a corresponding counterclockwise rotation of the rudder bar 128.

In addition, fluid under pressure will be applied from line 168 to junction 166, and through line 174 to ports 176, 176' (FIG. 6) of valve 177 which initially is in closed position.

Due to the initial movement of the rudder bar 128 in a counterclockwise direction, bar 197 will be moved to the right causing the roller 195 of valve 177 to roll down the inclined camming surface 196 so that the valve member 193 of valve 177 will move downwardly connecting ports 176'-192 and 175-191. As a result, fluid under pressure will flow into port 189 of actuator 131 lifting the piston rod 129 thereof which will react against the end 130 of rudder bar 128 also urging the latter in a counterclockwise direction.

When the rudder bar swings through an angle of say 35° in a counterclockwise direction, it will engage the micro switch 203 thereby completing a circuit through closed switch 205 to solenoid valve 206. As a result, the ports 208, 209 of valve 206 will be connected to port 211 of said valve 206.

This short circuits or decompresses the pressure lines 124, 126 of the telemotor. As one of the pressure sources to the actuator 143 will be cut off, i.e., from pressure line 124 to the small chamber 0, it is apparent that the rate of extension of the actuator 143 will be considerably reduced and hence the rate of rotation of the rudder shaft will be correspondingly reduced. As a result, there will be no rapid swing of the rudder past 35° in the illustrative embodiment herein which would be dangerous at high speed where the rudder is subjected to excessive stresses, and the relatively slower movement of the rudder past the 35° position will have no dangerous effect on ships sailing at high speed.

Where it is desired to effect larger more rapid angular movement of the rudder when the ship is moving slowly such as when docking, it is merely necessary to retain switch 205 in open position so that valve 206 will not be energized when microswitch 203 is engaged.

As soon as the helmsman stops rotation of the wheel 122 no further fluid under pressure will be applied to ports 156, 157 of actuator 143, nor to ports 217 or 218 of valve 172. As a result, due to the force of coil spring 230 at the upper end of valve member 224, the latter will be moved downwardly, to close ports 169-171 so that no further fluid under pressure will be applied from source S to actuator 131, 152 and hence the rudder bar will remain in set position until the helmsman turns the wheel 122 in the opposite direction.

In the event that one of the fluid sources from telemotor 121 should fail, i.e., if no fluid under pressure should flow through line 123 to port 217 of valve 172, the fluid under pressure from line 124 to port 218 will still effect movement of the valve member 224 and also such pressure from line 124 to port 157 of actuator 143 will still effect outward movement of piston rod 142.

In the event that the power source S should fail, steering at reduced speed can still be effected. Thus, the fluid from the telemotor applied to actuators 143, 144 will provide outward movement of the piston rods 142 thereof as desired for movement of lever 136 and rudder bar 128, the check valves 184, 185 permitting movement of the piston rod of actuator 131 and the check valves 178, 179 permitting movement of the piston rod of actuator 152, so that said actuators will not interfere with movement of the rudder bar by the actuators 143, 144 alone.

Where, when the ship is to be docked, it is desired to rotate the rudder 90° to make use of an auxiliary docking propeller carried by the rudder, it is merely necessary to open switch 205 so that microswitches 203, 204 will not be operative.

On large ships, hand operation by a manually operated telemotor is not feasible even at low speed, due to the great torque required to move the extremely large rudder employed.

The equipment shown in FIG. 7 is desirable in such case.

As shown in FIG. 7, the equipment comprises a power source S' which comprises a reservoir 251, having a partition 252 rising illustratively one-half of the height thereof defining two chambers A, B. The inlets of two constantly driven pumps 253, 254 are connected respectively to said chambers A, B and the inlet of a normally de-energized standby pump 255 is also connected to chamber A.

The outlets of said pumps 253, 254, 255 are connected to common line 256 and a normally open solenoid valve 257 having ports 261, 262 is interposed in said line between pumps 253, 254.

Mounted in the reservoir above the partition 252 is a float switch 258 which is designed to actuate the valve 257 to close the latter when the level of the liquid in the reservoir falls below a predetermined amount.

The line 256 on the side thereof connected to port 262 of valve 257, is connected by line 263 to port 264 of valve 265, said valve 265 having a port 266 connected by return line 267 to reservoir 251 and two additional ports 268, 269.

The line 256 on the side thereof connected to port 261 of valve 257 is connected to port 271 of a valve 272, the latter having two additional ports 273, 274. The valve 272 has a control port 270 connected to pressure switch PS and to the fluid port of pressure accumulator 275. The pressure switch controls pump 255 to energize the latter if the pressure in the accumulator should fall below a predetermined value. Port 273 is connected to the fluid port of pressure accumulator 275 and to the port 276 of normally closed solenoid valve 277.

Port 274 of valve 272 is normally connected to port 271 when the accumulator is charged and said port 274 and port 280 of valve 277 are connected by line 283 to port 284 of a valve 285 identical to valve 265. The valve 285 has a port 286 connected by return line 287 to reservoir 251 and two additional ports 288, 289.

The valves 265, 285 have slidable valve members controlling the ports thereof, said valve members being connected by rod 291 to move in unison. The mid point 292 of rod 291 is connected as at 293 to one end of a pivoted actuating lever 294 which, when moved to the left or right of neutral position, will actuate the valves 265, 285.

In addition, each valve has a pressure port 295, 296 at each end to permit hydraulic actuation thereof in the manner to be described.

The valves 265, 285 may also be actuated by an electric motor 297, the shaft of which, through an electric clutch 297' drives a pinion 298 which in turn drives a rack 299 connected to lever 294.

Thus, the servo valves 265, 285 may be operated manually by lever 294, hydraulically by fluid applied to ports 295, 296 or electrically by motor 297.

The ports 268, 269 and 289, 288 of valves 265, 285 are connected respectively to the ports 302, 301 of hydraulic actuators 303, 304 on each side of the piston 305 thereof. Each actuator is pivotally mounted at one end as at 306 and has a piston rod 307 secured to the piston 305 thereof and pivotally connected as at 308 to a rudder bar 309 on each side of the rudder shaft 311 to which the rudder bar is secured.

One end of the rudder bar 309 is pivotally connected as at 312 to the outer end of the piston rod 313 of hydraulic actuator 314. Actuator 314 is pivotally mounted at one end as at 315 and has a piston 316 slidable therein to which the piston rod 313 is secured.

The actuator 314 has a curved actuating arm 317 secured thereto which has a reduced portion 318 defining an inclined camming surface 319.

A valve 321 similar to valve 98 in FIG. 2, has a roller 322 secured to the valve member thereof, which roller when the pivots 308, 312 and 315 are longitudinally aligned, rests on the mid portion of said inclined surface.

The valve 321 has ports 323 and 324 connected to lines 325, 326 connected to ports 288, 289 of valve 285 and ports 327, 328 connected to ports 331, 332 on each side of the piston 316 of actuator 314.

Secured to actuator 314 and extending beyond the pivoted end 315 thereof is a bar 333 against which rests the ends 334 of the piston rods 335 of hydraulic actuator 336, 337, the ends 334 being equally spaced on each side of the pivot 315.

The actuators 336, 337 are rigidly secured and each has a port 338 at the closed end thereof connected by lines 339, 341 to telemotor 342. In addition, lines 339 and 349 are connected to ports 295, 296 of valves 265, 285 respectively.

*Operation, FIG. 7*

In the operation of the equipment shown in FIG. 7 before the accumulator 275 is charged, the valve 272 will be in position connecting ports 271 and 273 and the pressure switch PS will complete the circuit to pump 255. When the main power switch (not shown) is closed, the pumps 253, 254 and 255 will be energized.

Operation of pump 255 will charge the accumulator through connected ports 271, 273 of valve 272 and when the accumulator is charged, valve 272 will switch to connect ports 271, 274 and the pressure switch will cut off pump 255.

At this time fluid will flow from pumps 253, 254 through common lines 256 and lines 283, 263 respectively to ports 284, 264 of valves 285, 265. As these valves in the neutral position have ports 284, 286 and 264, 266 connected, such fluid will flow through the associated return lines 287 and 267 back to the reservoir 251.

When the steering wheel 345 of the telemotor 342 is rotated, fluid under pressure will flow, say, through line 339 to port 338 of actuator 336 and to port 295 of valve 265.

As a result of the fluid under pressure applied to port 295 of valve 265, the valve member of valves 265, 285 will move to the right and the ports 264, 268 and 266, 269 of valve 265 will be connected and the ports 286, 289 and 284, 288 of valve 285 will be connected.

Consequently, fluid under pressure will be applied from both pumps 253, 254 to port 302 of actuator 303 (through valve 265) and to port 301 of actuator 304 (through valve 285) so that the piston rods 307 of actuators 303, 304 will respectivly push and pull against the ends of the rudder bar 309 to pivot the latter in a clockwise direction. This will pivot the actuator 314 in a counterclockwise direction to move the associated portion of bar 333 away from the end 334 of the piston rod 335 of actuator 336, said piston rod 335 following the bar due to the pressure applied to port 38 so long as the steering wheel 342 is being rotated.

As a result of the counterclockwise movement of actuator 314, the roller 319 of valve 321 will ride up the camming surface 322 of arm 317 thereby connecting ports 323 and 328 of valve 321 so that fluid under pressure will flow into port 332 of actuator 314 to move its piston rod outwardly to urge the rudder bar 309 in such clockwise direction.

If the helmsman should stop rotation of steering wheel 345, the flow through line 339 would stop. However, due to the slight additional movement of the rudder bar 309 and hence the actuator 314 and bar 333, the latter would move away from the end 334 of the piston rod 335 of actuator 336 thereby causing the pressure in actuator 336 to drop to zero. However, the pressure in actuator 337 will increase as valves (not shown) in the telemotor 342 which close when the steering wheel is not rotated, would close lines 339, 341 and hence such increase in pressure in actuator 337 would cause the valve member of valve 285 to move to the left. This would also cause the valve member of valve 265 to move to the left until both valves were in neutral position.

To restore the rudder bar to neutral position or to move it in a counterclockwise direction from neutral position would merely require the steering wheel to be rotated in the opposite direction.

In order to shift from the hydraulic control effected by the operation of telemotor 342 to the electrical control, it is necessary to prevent interference by the hydraulic system including the lines 339, 341 to the telemotor which are charged with oil.

To this end, the switch 351 is provided which, when closed, energizes the clutch 297' operatively to connect the pinion 298 to rack 299 and also energizes solenoid valve 352 to connect lines 339, 341 to reservoir 251. Thereupon, the steering switch 353 may be moved to the left or right from neutral position to cause corresponding rotation of motor 297 and hence to move the rack 299 and the control lever 287 as desired.

It is to be noted that the accumulator 275 normally is not in the system but is connected into the system when valve 277 is energized.

This occurs when the valves 265, 285 are in the full open position which occurs only when there is quick movement of the steering wheel 342, for example, which permits such full opening in an emergency condition.

Thus, a pair of contacts 355 are provided which are engaged by a movable contact 356 carried by the rack 299 when the latter is in the two extreme positions.

At this time the accumulator would supply additional energy to that furnished by pumps 253, 254. If the accumulator was in circuit at all times, excess energy would be furnished with resultant unnecessary power consumption.

It is desirable to have a continuous system to both of the actuators 303, 304 so that they will operate uniformly. If the two pumps 253, 254 were connected to the associated actuators separately, jerky action might occur.

The system provides for such smooth actuation, yet provides security against failure of part of the hydraulic system.

Thus, in the event that there should be a break in line 263, for example, the level of the liquid in reservoir 251 would drop and the float would cause switch 258 to close valve 257 to isolated chambers A and B. As a result, the liquid in chamber A could not drop below the level of partition 252 and hence the pump 253 would still provide fluid to the system which would still be operative although with less power.

In the embodiment shown in FIG. 8, the rudder bar 400 is secured to the rudder shaft 401, which extends perpendicular thereto. The rudder bar 400 has a central extension 403 extending at right angles thereto and in the same plane.

Pivotally connected to the ends of the rudder bar as at 404 are the ends of the piston rods 405 of hydraulic actuators 406, 407. Each of the actuators is pivoted at one end as at 408 to a fixed support and each has a port 409, 410 leading thereinto adjacent such pivoted end 408.

The ports 409, 410 are connected by lines 411, 412 to junctions 413, 414 which are connected by lines 415, 416 to a telemotor 417 which has a steering wheel 418. Upon rotation of said steering wheel, fluid under pressure will be forced through one of the lines 415, 416 and returned through the other.

The junctions 413, 414 are connected by lines 421, 422 to the ports 423, 424 of a valve 425, identical to the valve 98 shown in FIG. 2, said valve having additional ports 426, 427, 428. The valve member 429 of valve 425 in the neutral position thereof closes said ports so that no fluid will flow through the valve.

As shown in FIG. 8, the valve member 424 is normally spring-urged downwardly and the extension 431 thereof mounts a roller 432, which, when the rudder bar 400 is in neutral position, rests against the mid portion of the camming surface 433 of a cam 434 carried by shaft 401.

The end of extension 403 of the rudder bar 400 is pivoted as at 435 to the piston rod 436 of hydraulic actuator 437 which is pivoted to a fixed support as at 438.

As is clearly shown in FIG. 8, with the rudder bar in neutral position, the pivotal axis defined by shaft 401 and the pivots 435, 438 are longitudinally aligned.

The actuator 437 has ports 441, 442 positioned respectively on each side of the piston 443 thereof, said ports being connected respectively to the ports 444, 445 of a valve 446, the latter having three additional ports 447, 448 and 449.

The valve 446 has a slidable valve member 451 which is normally retained by springs 452 in position to close the ports of the valve.

The ports 447, 449 are connected by line 452′ to reservoir 453 and the port 448 is connected by line 454 to the liquid port of a pressure accumulator 455 and through check valve 456 to the outlet of a pump 457, the inlet of which is connected to said reservoir 453. The check valve 456 is designed to permit flow only from the pump to the accumulator and not in the reverse direction.

The valve 446 has control ports 458, 459 at its ends respectively which are connected by line 461 to ports 426, 428 of valve 425 and by line 462 to port 427 of said valve 425.

*Operation, FIG. 8*

In the operation of the embodiment of FIG. 8, which is intended for small vessels, when the steering wheel is turned in direction to force fluid through line 415, such fluid will enter port 409 of actuator 406 to move the piston rod 405 thereof outwardly thereby causing the rudder bar to move in a counterclockwise direction. As this occurs, the roller 432 rides up the camming surface 433 to lift the valve member 429 of valve 425.

As a result, the ports 423, 427 and 424, 428 of valve 425 will be connected. Fluid under pressure will flow through line 462 into port 459 of valve 446 to lift the valve member 451 thereby connecting ports 448, 445 and 447, 444.

As a result of the connection of ports 448, 445, fluid under pressure will be supplied from accumulator 445 to port 442 of actuator 437 to force the piston rod 436 thereof outwardly. As the initial counterclockwise rotation of the rudder bar caused the actuator 437 to pivot in a clockwise direction, it will now be in a position such that outward movement of the piston rod thereof will apply considerable force against extension 403 of the rudder bar 400 to rotate the latter in such counterclockwise direction.

As soon as the helmsman stops rotation of the steering wheel 418, flow of fluid through line 415 will close. Hence, no further fluid will be forced into actuator 406 or through valve 425 to port 459 of valve 446.

As a result, the upper spring 452 of valve 446 will move the valve member 451 thereof to closed position so that no further fluid under pressure will be applied to actuator 437 from the accumulator 455.

Consequently, since the actuators 406 and 437 are no longer exerting force against the rudder bar 400, it will remain in its set position.

It is to be noted that as in the case of the other embodiments herein, when the steering wheel of the telemotor 417 is not rotated, suitable valves in the lines from the telemotor will close to block flow of fluid in such lines.

As the roller 432 is resting on the cam 434, the valve member 429 of valve 425 will remain in its upper position.

It at this time the helmsman should wish to restore the rudder to neutral position he need merely rotate the steering wheel in the opposite direction so that fluid will flow through line 416.

As a result, the piston rod 405 of actuator 407 will be moved downwardly urging the rudder bar in a clockwise direction. In addition, fluid will initially flow through ports 424, 428 of valve 425 which are connected, so that it will enter port 458 of valve 446 to move the valve member 451 thereof downwardly to connect ports 448, 444 so that fluid under pressure will be applied from accumulator 455 to port 441 of actuator 437. As a result, the piston rod 436 of actuator 437 will move downwardly to move the rudder bar in a clockwise direction toward neutral position.

As soon as the rudder bar approaches neutral position, the cam 434 will permit the valve member 429 to move downwardly closing the ports of valve 425 and hence permitting valve 446 to restore to neutral or closed position so that only the actuator 407 will be in circuit to finally move the rudder bar to its neutral position which will occur with substantially no over-shooting.

To move the rudder in the opposite direction, the helmsman need merely continue the rotation of the steering wheel 418 and the operation previously described, but with the valve member 429 moving downwardly will occur.

It is to be noted that in all of the embodiments herein shown, the telemotor and associated hydraulic circuitry applies relatively low power to effect movement of the rudder shaft and the main power source and associate circuitry applies high power to effect movement of the rudder shaft.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by United States Letters Patent is:

1. A hydraulic control system for effecting rotary movement of a shaft on each side of a neutral position, said system comprising a hydraulic actuator having a cylinder pivotally mounted at one end to a fixed support and having a piston rod slidable therein, an arm rigidly connected to said shaft and extending at right angles thereto, means pivotally connecting said arm to the end of said piston rod; the pivotal axis of said shaft, the pivotal connection of said piston rod to said arm and the fixed pivotal mount of said cylinder being longitudinally aligned when said shaft is in neutral position, means initially to effect movement of said movable member on each side of its neutral position and means controlled by the initial movement of said shaft away from its neutral position to actuate said hydraulic actuator to apply additional force to said shaft in the direction of such movement away from its neutral position.

2. A hydraulic control system for effecting rotary movement of a movable member on each side of a neutral position, said system comprising a hydraulic actuator operatively connected to said movable member, means initially to effect movement of said movable member on each side of its neutral position, means controlled by the initial movement of said movable member away from its neutral position to actuate said hydraulic actuator to apply additional force to said movable member in the direction of such movement away from its neutral position, a source of fluid under pressure, a reversing valve operatively connected to said source of fluid under pressure and said hydraulic actuator, the means controlled by the movement of said movable member away from its neutral position actuating said valve to apply fluid under pressure to said actuator in direction to cause the actuator to react against said movable member in the direction of the movement of the movable member away from its neutral position.

3. The combination set forth in claim 2 in which said reversing valve has a movable valve member, a cam is provided controlling said valve member, and means operatively connecting said cam to said movable member to effect movement of said cam on movement of said movable member away from its neutral position to actuate the valve member of said reversing valve.

4. A hydraulic control system for effecting rotary movement of a movable member on each side of a neutral position, said system comprising a hydraulic actuator operatively connected to said movable member, means initially to effect movement of said movable member on each side of its neutral position, said means comprising a pair of servo-hydraulic actuators each comprising a cylinder pivotally mounted at one end to a fixed support, each of said actuators having a movable piston rod, means operatively connecting said piston rods to said movable member, means to apply fluid under pressure to said servo actuators to effect initial movement of said movable member away from its neutral position on each side thereof respectively, and means controlled by the initial movement of said movable member away from its neutral position to actuate said hydraulic actuator to apply additional force to said movable member in the direction of such movement away from its neutral position.

5. The combination set forth in claim 4 in which the means to apply fluid under pressure to said servo actuators comprises a telemotor having a steering wheel and fluid pumps controlled by the rotation of said steering wheel selectively to apply such fluid under pressure to said servo actuators depending upon the direction of rotation of said steering wheel.

6. A hydraulic control system for effecting rotary movement of a movable member on each side of a neutral position, said system comprising a hydraulic actuator having a cylinder pivotally mounted at one end to a fixed support and having said piston rod slidable therein, an arm rigidly connected to said shaft and extending at right angles thereto on each side thereof, means pivotally connecting one end of said arm to the piston rod of said hydraulic actuator; the pivotal axis of said shaft, the pivotal connection of said piston rod to said arm and the fixed pivotal mount of said cylinder being longitudinally aligned when said shaft is in neutral position, means initially to effect movement of said movable member on each side of its neutral position, said means comprising a pair of servo hydraulic actuators each comprising a cylinder pivotally mounted at one end to a fixed support, each of said cylinders having a movable piston rod, means pivotally connecting the outer ends of said piston rods to said arm on each side of said shaft equidistant respectively from said shaft, means alternately to apply fluid under pressure to said servo actuators to effect initial movement of said shaft away from its neutral position on each side thereof respectively, and means controlled by the initial movement of said movable member away from its neutral position to actuate said hydraulic actuator to apply additional force to said movable member in the direction of such movement away from its neutral position.

7. A hydraulic control system for effecting rotary movement of a movable member on each side of a neutral position, said system comprising a hydraulic actuator operatively connected to said movable member, a first source of fluid under pressure, means controlled by said first source of fluid under pressure initially to effect movement of said movable member on each side of its neutral position, a control valve, a second source of fluid under pressure controlled by said control valve, a reversing valve operatively connected to said control valve and said hydraulic actuator to control the direction of the flow of fluid from said second source through said control valve into said hydraulic actuator and means controlled by the initial movement of said movable member away from its neutral position to actuate said reversing valve to apply fluid under pressure to said hydraulic actuator in direction to cause said actuator to react against the movable member in the direction of the movement of said movable member away from its neutral position.

8. The combination set forth in claim 7 in which said control valve is hydraulically actuated and is operatively connected to said first source of fluid under pressure.

9. The combination set forth in claim 7 in which said control valve is electrically actuated and a switch is provided to energize said control valve.

10. A hydraulic control system for effecting rotary movement of a shaft on each side of a neutral position, said system comprising a hydraulic actuator comprising a cylinder pivotally mounted at one end to a fixed support and having a piston rod slidable therein, an arm rigidly connected to said shaft and extending at right angles thereto on each side thereof, means pivotally connecting one end of said arm to the piston rod of said hydraulic actuator, the pivotal axis of said shaft, the pivotal connection of said piston rod to said arm and the fixed pivotal mount of said cylinder being longitudinally aligned when said shaft is in neutral position, a pair of servo hydraulic actuators each comprising a cylinder pivotally mounted at one end to a fixed support, each of said cylinders having a movable piston rod pivotally connected at its other end to said arm on each side of said shaft, equidistant respectively from said shaft, a first source of fluid under pressure, means alternately to apply fluid under pressure from said first source to said servo actuators to effect initial movement of said shaft away from its neutral position on each side thereof respectively, a control valve, a second source of fluid under pressure controlled by said control valve, a reversing valve operatively connected to said control valve and said hydraulic actuator to control the direction of the flow of fluid from said second source through said control valve into said hydraulic actuator and means controlled by the initial movement of said shaft away from its neutral position to actuate said reversing valve to apply fluid under pressure to said hydraulic actuator in direction to move the piston rod thereof in the direction of the movement of said shaft away from its neutral position.

11. The combination set forth in claim 10 in which a pressure relief valve is connected to said hydraulic actuator.

12. The combination set forth in claim 10 in which said control valve is hydraulically actuated, said first source of fluid under pressure comprises a telemotor having a steering wheel and a fluid pump controlled by rotation of said steering wheel selectively to apply such fluid under pressure to said servo actuator and to said control valve depending upon the direction of rotation of said steering wheel.

13. The combination set forth in claim 12 in which pressure relief means are connected to said servo actuators.

14. A hydraulic control system for effecting rotary movement of a shaft on each side of a neutral position, said system comprising a first and second hydraulic actuator each comprising a cylinder pivotally mounted at one end to a fixed support and having a piston rod slidable thereon, an arm rigidly connected to said shaft at one end and extending at right angles thereto, means pivotally connecting the other end of said arm to the piston rod of said first actuator; the pivotal axis of said shaft, the pivotal connection of said piston rod to said arm and the fixed pivotal mount of said cylinder of said first actuator being longitudinally aligned when said shaft is in neutral position, a substantially L-shaped lever having a pair of arms, means pivotally mounting said lever, means pivotally connecting one end of one of the arms of said lever to the piston rod of said second actuator, a link pivotally connected at one end to said shaft arm between its ends and at its other end to the pivotal connection of the lever arm to the piston rod, a pair of servo hydraulic actuators each comprising a cylinder pivotally mounted at one end to a fixed support, each of said cylinders having a movable piston rod pivotally connected at its outer end to the other arm of said lever on each side of its pivotal mount and equidistantly spaced from said mount, a first source of fluid under pressure, means alternately to apply fluid under pressure from said first source to said servo actuators to effect pivotal movement of said lever and said shaft arm and said shaft, from the neutral position of said shaft to either side respectively, a second source of fluid under pressure, a control valve, controlling said second source and the direction of flow of fluid from said second source to said second actuator, a reversing valve operatively connected between said control valve and said first actuator to control the direction of the flow of fluid from said second source through said control valve into said first actuator and means controlled by the initial movement of said shaft away from its neutral position to actuate said reversing valve to apply fluid under pressure to said first actuator in direction to move the piston rod thereof in the direction of the movement of said shaft away from its neutral position.

15. The combination set forth in claim 14 in which means are provided to limit the angular movement of said shaft on each side of its neutral position.

16. The combination set forth in claim 14 in which means are provided to cut off flow of fluid under pressure to said actuators when the shaft has rotated a predetermined amount on each side of its neutral position.

17. A hydraulic control system for effecting rotary movement of a shaft on each side of a neutral position, said system comprising a pair of hydraulic actuators each comprising a cylinder pivotally mounted at one end to a fixed support and having a piston rod slidable therein, an arm rigidly connected to said shaft and extending at right angles thereto on each side thereof, means pivotally connecting one end of each of said piston rods to said arm on each side of said shaft and equidistantly spaced therefrom, an additional hydraulic actuator comprising a cylinder pivotally mounted at one end to a fixed support and having a piston rod slidable therein, means pivotally connecting one end of said arm to the piston rod of the additional actuator; the pivotal axis of said shaft, the pivotal connection of the piston rod of said additional actuator to said arm and the fixed pivotal mount of said additional actuator being longitudinally aligned when said shaft is in neutral position, a pair of ganged reversing valves adapted to move in unison and connected respectively between said first source of fluid under pressure and said pair of hydraulic actuators, means to actuate said reversing valves to apply fluid under pressure from said first source to said pair of hydraulic actuators to effect movement of said shaft from its neutral position, an additional reversing valve, and means controlled by the initial movement of said shaft away from its neutral position to actuate said additional reversing valve to apply fluid under pressure to said additional hydraulic actuator in direction to move the piston rod thereof in the direction of the movement of said shaft away from its neutral position.

18. The combination set forth in claim 17 in which a second source of fluid under pressure is provided, said reversing valves are hydraulically controlled, said second source of fluid is connected to said reversing valves and means are provided to direct such fluid into one or the other of said reversing valves.

19. The combination set forth in claim 17 in which electric drive means are provided to actuate said ganged reversing valves.

20. The combination set forth in claim 17 in which a bar is secured to said additional actuator and extends longitudinally thereof beyond the fixed pivot thereof, a pair of servo hydraulic actuators are provided each comprising a fixed cylinder and having a piston rod slidable therein, the ends of said piston rods being adapted to engage said bar on each side of the fixed pivot thereof and equidistantly spaced therefrom, a second source of fluid under pressure is provided operatively connected to said servo actuators, and means alternately to apply fluid from said second source to said servo actuators to effect initial movement of said shaft.

21. The combination set forth in claim 17 in which said first source of fluid comprises a reservoir having a partition therein defining two chambers, a pair of pumps having their inlets connected respectively to said chambers, a common line, the outlets of said pumps being connected to said common line, a normally open valve connected in said common line between said pump outlets, means when the level of the fluid in the reservoir falls below a predetermined amount to close said valve, said common line on each side of said valve being connected respectively to said pair of reversing valves.

22. The combination set forth in claim 21 in which a pressure accumulator is provided, means to charge said accumulator and means to connect said accumulator into the hydraulic circuit to said reversing valves when the latter have been moved to fully open position.

23. A hydraulic system for effecting rotary movement of a shaft on each side of a neutral position, said system comprising a pair of hydraulic actuators each comprising a cylinder pivotally mounted at one end to a fixed support and having a piston rod slidable therein, an arm rigidly connected to said shaft and extending at right angles thereto on each side thereof, means pivotally connecting one end of each of said piston rods to said arm on each side of said shaft and equidistantly spaced therefrom an extension arm rigid with said shaft arm and extending at right angles thereto and aligned with the axis of said shaft, an additional hydraulic actuator comprising a cylinder pivotally mounted at one end to a fixed support, and having a piston rod slidable thereon, means pivotally connecting one end of said extension arm to the piston rod of the additional actuator; the pivotal axis of said shaft, the pivotal connection of the piston rod of said additional actuator to said extension arm and the fixed pivotal mount of said additional actuator being longitudinally aligned when said shaft is in neutral position, a first source of fluid under pressure, a reversing valve connected between said source of fluid and said additional actuator and normally cutting off flow of fluid to said additional actuator when said shaft is in neutral position, a second source of fluid under pressure, a second reversing valve connected between said first reversing valve and said second source of fluid under pressure, and means to apply fluid from said second source to one of said pair of hydraulic actuators to effect initial movement of said shaft from its neutral position and means controlled by the initial movement of said shaft away from its neutral position to actuate said second reversing valve to permit flow of fluid therethrough from said second source of fluid to said first reversing valve to actuate the latter to connect said first source of fluid to said additional actuator in direction to move the piston rod thereof in the direction of the movement of the shaft away from its neutral position.

24. The combination set forth in claim 23 in which said first reversing valve has a slidable valve member having an extension, a cam is movable with said shaft and engages said extension to effect movement of said slidable member upon rotation of said shaft.

25. A hydraulic control system for effecting movement of a movable member on each side of a neutral position comprising a telemotor connected through two pressure lines to hydraulic motor means operatively connected to said movable member, hydraulic servo-valve means responsive to the difference of pressure between said two pressure lines controlling the connections of a source of pressure to a second hydraulic motor means to apply additional force to said hydraulic motor means in the direction of the initial movement away from its neutral position, and a second independent telemotor, acting in the same direction as the first telemotor, said servo-valve means also being responsive to said second telemotor.

26. The combination set forth in claim 25, in which the second telemotor is also of the hydraulic type.

27. The combination set forth in claim 25, in which the second telemotor is of the electric type controlling solenoid means integrated within the hydraulic servo-valve means.

28. The combination set forth in claim 25, in which the second telemotor is of the electric type, and comprises a reversible electric motor controlling two operatively connected hydraulic servo valves, each controlling the connections of two independent sources of pressure to two independent hydraulic motor means.

References Cited in the file of this patent

UNITED STATES PATENTS

| | | |
|---|---|---|
| 2,859,592 | Mercier et al. | Nov. 11, 1958 |
| 2,892,310 | Mercier | June 30, 1959 |
| 3,009,322 | Mercier | Nov. 21, 1961 |

FOREIGN PATENTS

| | | |
|---|---|---|
| 1,203,051 | France | July 27, 1959 |